US009181438B2

(12) United States Patent
Woodhall et al.

(10) Patent No.: US 9,181,438 B2
(45) Date of Patent: Nov. 10, 2015

(54) MASKING SOLUTIONS COMPRISING SILOXANE-BASED SURFACTANTS FOR USING IN PAINTING OPERATIONS

(71) Applicant: Cal-West Specialty Coatings, Inc., Sunnyvale, CA (US)

(72) Inventors: Edward W. Woodhall, Los Altos, CA (US); Robert Louis Mesa, Santa Clara, CA (US)

(73) Assignee: Cal-West Specialty Coatings, Inc., Sunnyvale, CA (US)

( * ) Notice: Subject to any disclaimer, the term of this patent is extended or adjusted under 35 U.S.C. 154(b) by 0 days.

(21) Appl. No.: 13/708,676

(22) Filed: Dec. 7, 2012

(65) Prior Publication Data

US 2013/0224501 A1    Aug. 29, 2013

Related U.S. Application Data

(60) Continuation of application No. 13/323,599, filed on Dec. 12, 2011, now abandoned, which is a division of application No. 11/671,354, filed on Feb. 5, 2007, now abandoned, and a continuation-in-part of application No. 11/149,785, filed on Jun. 9, 2005, now abandoned.

(60) Provisional application No. 60/771,085, filed on Feb. 6, 2006, provisional application No. 60/579,851, filed on Jun. 14, 2004.

(51) Int. Cl.
| C08K 5/06 | (2006.01) |
|---|---|
| C09D 5/00 | (2006.01) |
| B05D 1/32 | (2006.01) |
| B05D 7/02 | (2006.01) |
| B05D 7/14 | (2006.01) |
| C09D 5/20 | (2006.01) |
| B65D 85/00 | (2006.01) |

(52) U.S. Cl.
CPC ............... C09D 5/008 (2013.01); B05D 1/327 (2013.01); B05D 7/02 (2013.01); B05D 7/14 (2013.01); B65D 85/00 (2013.01); C09D 5/20 (2013.01); B05D 2202/00 (2013.01); Y10T 428/31663 (2015.04)

(58) Field of Classification Search
CPC ............ B05D 1/327; B05D 7/02; B05D 7/14; B65D 85/00; C09D 5/008; C09D 5/20
USPC .................... 524/55, 376, 388, 503
See application file for complete search history.

(56) References Cited

U.S. PATENT DOCUMENTS

| 2,020,256 A | 11/1935 | Copeman |
|---|---|---|
| 2,082,791 A | 6/1937 | Copeman |
| 2,275,578 A | 3/1942 | Wood |
| 2,372,982 A | 4/1945 | Richards et al. |
| 2,420,720 A | 5/1947 | Pechukas et al. |
| 2,603,574 A | 7/1952 | Holmes |
| 3,114,650 A | 12/1963 | Oppenheim et al. |
| 3,114,656 A | 12/1963 | Opila |
| 3,146,883 A | 9/1964 | Harlan et al. |
| 3,201,274 A | 8/1965 | Hobbs, Jr. |
| 3,202,554 A | 8/1965 | Vielstich |
| 3,218,183 A | 11/1965 | Fritzsching et al. |
| 3,432,225 A | 3/1969 | Rock |
| 3,445,275 A | 5/1969 | Bogart |
| 3,492,258 A | 1/1970 | Kremer |
| 3,620,796 A | 11/1971 | Gordy |
| 3,625,727 A | 12/1971 | Lightfoot et al. |
| 3,696,498 A | 10/1972 | Leontaritis et al. |
| 3,712,829 A | 1/1973 | Steigelman |
| 4,053,666 A | 10/1977 | Taylor et al. |
| 4,055,441 A | 10/1977 | Taylor et al. |
| 4,145,855 A | 3/1979 | Sheldon |
| 4,169,088 A | 9/1979 | Hansen |
| 4,199,620 A | 4/1980 | Edwards et al. |
| 4,200,671 A | 4/1980 | Krajewski et al. |
| 4,222,922 A | 9/1980 | Rees |
| 4,287,103 A | 9/1981 | Green et al. |
| 4,418,138 A | 11/1983 | Curtis |
| 4,428,857 A | 1/1984 | Taylor et al. |
| 4,456,731 A | 6/1984 | Caporossi et al. |
| 4,582,761 A | 4/1986 | Liu |

(Continued)

FOREIGN PATENT DOCUMENTS

| CA | 454888 | 3/1949 |
|---|---|---|
| EP | 1 130 068 A1 | 9/2001 |

(Continued)

OTHER PUBLICATIONS

US Office Action dated Aug. 6, 2010 issued in U.S. Appl. No. 11/671,354.
US Final Office Action dated Apr. 15, 2011 issued in U.S. Appl. No. 11/671,354.
US Office Action dated Jun. 8, 2012 issued in U.S. Appl. No. 13/323,599.
PCT International Search Report dated Oct. 5, 2006 issued in PCT/US2005/020429 (WO2005/123270).
PCT International Preliminary Report on Patentability and Written Opinion dated Dec. 14, 2006 PCT/U52005/020429 (WO2005/123270).

(Continued)

Primary Examiner — David W Wu
Assistant Examiner — Marie Reddick
(74) Attorney, Agent, or Firm — Tom Hunter; Weaver Austin Villeneuve & Sampson LLP

(57) ABSTRACT

This invention provides a masking material that can be used to protect an underling surface (e.g. an automobile surface) during an overcoating (e.g. painting) operation. The masking material in one embodiment includes a thickener and a pH control agent and water. The masking material can be applied to a surface that is to be protected from paint overspray or other coating processes, allowed to dry, and the surface then coated (e.g. with paint). After drying of the paint, or other coating, the masking material can removed by water washing.

25 Claims, No Drawings

(56) References Cited

U.S. PATENT DOCUMENTS

| | | | |
|---|---|---|---|
| 4,592,756 | A | 6/1986 | Kawasaki et al. |
| 4,612,058 | A | 9/1986 | Geke et al. |
| 4,634,607 | A | 1/1987 | Ernsberger |
| 4,748,049 | A | 5/1988 | Charles et al. |
| 4,759,959 | A | 7/1988 | Guy |
| 4,792,464 | A | 12/1988 | Martenson |
| 4,844,833 | A | 7/1989 | Komatsu et al. |
| 4,956,404 | A | 9/1990 | Pelzig |
| 5,026,597 | A | 6/1991 | Franz et al. |
| 5,028,350 | A | 7/1991 | Marsek |
| 5,093,401 | A | 3/1992 | Claussen et al. |
| 5,104,711 | A | 4/1992 | Marsek |
| 5,143,949 | A | 9/1992 | Grogan et al. |
| 5,151,461 | A | 9/1992 | Perrington et al. |
| 5,183,688 | A | 2/1993 | Sorko-Ram |
| 5,186,978 | A | 2/1993 | Woodhall et al. |
| 5,201,946 | A | 4/1993 | Marsek |
| 5,302,413 | A | 4/1994 | Woodhall et al. |
| 5,342,872 | A | 8/1994 | Huber |
| 5,362,786 | A | 11/1994 | Woodhall et al. |
| 5,411,760 | A | 5/1995 | Woodhall et al. |
| 5,420,015 | A | 5/1995 | Wuerch |
| 5,428,095 | A | 6/1995 | Swidler |
| 5,494,702 | A | 2/1996 | Blaine et al. |
| 5,523,117 | A | 6/1996 | Woodhall et al. |
| 5,550,182 | A | 8/1996 | Ely et al. |
| 5,567,756 | A | 10/1996 | Swidler |
| 5,604,282 | A | 2/1997 | Grogan et al. |
| 5,618,578 | A | 4/1997 | Blaine et al. |
| 5,719,221 | A | 2/1998 | Swidler |
| 5,739,191 | A | 4/1998 | Woodhall et al. |
| 5,750,190 | A | 5/1998 | Woodhall et al. |
| 5,837,076 | A | 11/1998 | Huber et al. |
| 6,074,986 | A | 6/2000 | Mulqueen et al. |
| 6,117,485 | A | 9/2000 | Woodhall et al. |
| 6,124,044 | A | 9/2000 | Swidler |
| 6,521,699 | B2 | 2/2003 | Feder et al. |
| 6,962,955 | B2 | 11/2005 | Kusudou et al. |
| 2003/0032706 | A1 | 2/2003 | Blaine et al. |
| 2003/0125457 | A1 | 7/2003 | Schafheutle et al. |
| 2004/0043901 | A1 | 3/2004 | Ono |
| 2006/0008585 | A1 | 1/2006 | Woodhall et al. |
| 2007/0207269 | A1 | 9/2007 | Woodhall et al. |
| 2012/0148747 | A1 | 6/2012 | Woodhall et al. |

FOREIGN PATENT DOCUMENTS

| | | |
|---|---|---|
| GB | 2191717 | 12/1987 |
| JP | 58-80301 | 5/1983 |
| SE | 185 634 | 10/1963 |
| WO | WO 03/029372 | 4/2003 |
| WO | WO 2005/123270 | 12/2005 |
| WO | WO 2007/092412 | 11/2007 |

OTHER PUBLICATIONS

EP Supplementary Search Report dated Jul. 25, 2007 issued in EP 05 75 9177.8-2109.
EP Examination Report dated Feb. 10, 2010 issued in EP 05 75 9177.8-2109.
EP Examination Report dated Aug. 27, 2010 issued in EP 05 75 9177.8-2109.
EP Examination Report dated Jan. 24, 2011 issued in EP 05 75 9177.8-2109.
PCT International Search Report dated Sep. 27, 2007 issued in PCT/US2007/03093 (WO2007/092412).
PCT International Preliminary Report on Patentability and Written Opinion Aug. 12, 2008 issued in PCT/US2007/03093 (WO2007/092412).
Chinese First Office Action dated Dec. 9, 2010 issued in 200780012042.5.
GB Examination Report dated Sep. 6, 2010 issued in GB 0815820.6.
"Clean Strip" Report re: Comparison of Two Liquid Samples, Report for Ed Woodhall, Cal West, *Carter Analytical Lab.*, Inc. Analysis (no date)Order 10511, 2 pages.
"Elvanol" Product & Properties Guide, Mono-Sol Div. of Chris-Craft Corp. (no date), 8 pages.
Fluorad Technical Brochure, "What is surfactant?" (no date), 6 pages.
"Kwikee Masking Paper" Material Safety Data Sheet, Rukin Industries, Inc. Oct. 25, 1990 Kwikee Spray Mask, Paint Overspray Protectant and Booth Coating, *Material Data Safety Sheet*, Rukin Industries, Inc., Effective Date: Nov. 7, 1990, 2 pages.
"Liquid Masking Paper", *Autophile*, Rukin Industries, Inc., Technical Bulletin #3, Dec. 1, 1991, 2 pages.
"Liquid Masking Paper", Material Safety Data Sheet, *Autophile* Rukin Industries, Inc., Oct. 25, 1990, 2 pages.
Magic Mask product information, "Are the Extra Expenses of Your Overspray Masking System Killing You?", *U.S. Chemical & Plastics, Inc., Morton Paint Company*, Townsend, Inc., May 17, 1991 (alleged), 4 pages.
"Magic Mask" re: Analysis of Magic Mask and Slime, Report for Brian Wong, Cal West, *Carter Analytical Lab., Inc.* Apr. 12, 1991, 3 pages.
"Masker-Aide Technical Bulletin", Mar. 1993, 1 page.
"Masker-Aide" Material Safety Data Sheet, Mar. 17, 1993, 2 pages.
"Masker-Aide" product information. Solution Techniques, Inc. Jun. 1989 (1) Cal-West Automotive Inc. fax cover sheet, dated Sep. 21, 1990, (2)"Assoc. Members Given Preview of Overspray Protection Product", *Automotive Body Repair News*, Solution Techniques, Inc., Jun. 1989 p. 51; and (3) Masker-Aide by: Solution Techniques, Inc. Price list, 3 pages.
Partall ® Mold Release Agents Film #10 Paste #2 Product Bulletin (no date), faxed Jan. 3, 1994, 2 pages.
Partall Film #10, Material Safety Data Sheet (no date), (faxed Sep. 27, 1991), dated Sep. 29, 1991, 3 pages.
Parting Film No. 10 product information, *Costa Chemical Corp.* (no date): (1) product description; (2) Material Safety Data Sheet, 4 pages.
"Profile of a Polymer", *Gerhring-Montgomery, Inc.*, Sep. 1989, 7 pages.
Slime ® Product Information Sheet (no date), (faxed Sep. 27, 1991) 5 pages.
Zonyl Technical Brochure (no date), 16 pages.

MASKING SOLUTIONS COMPRISING SILOXANE-BASED SURFACTANTS FOR USING IN PAINTING OPERATIONS

CROSS-REFERENCE TO RELATED APPLICATIONS

This application is a Continuation of U.S. Ser. No. 13/323,599, filed Dec. 12, 2011 now abandoned, which is a Divisional of U.S. Ser. No. 11/671,354, filed on Feb. 5, 2007 now abandoned, which claims benefit of and priority to U.S. Ser. No. 60/771,085, filed on Feb. 6, 2006. U.S. Ser. No. 11/671,354 is also a continuation-in-part of U.S. Ser. No. 11/149,785, filed on Jun. 9, 2005 now abandoned, which claims benefit of and priority to U.S. Ser. No. 60/579,851, filed on Jun. 14, 2004, all of which are herein incorporated by reference in their entirety for all purposes.

STATEMENT AS TO RIGHTS TO INVENTIONS MADE UNDER FEDERALLY SPONSORED RESEARCH AND DEVELOPMENT

[Not Applicable]

FIELD OF THE INVENTION

The present invention relates to the field of protective coatings to be used during coating operations of various surfaces including surfaces of vehicles or buildings. In certain embodiments the invention provides an improved method and composition for masking selected portions of a surface, in particular a painted vehicle surface, from paint or other overcoating materials.

BACKGROUND OF THE INVENTION

It is well known that painting, or other overcoating operations often require masking of certain portions of the surface of the object to be painted to prevent overspray by the coating material (e.g. paint). For example, it is often necessary to mask trim, and/or windows, and/or certain already painted areas on a vehicle (e.g., a motor vehicle) or a component of a vehicle (e.g. a door, a bumper, a frame, etc.) from paint overspray.

Similarly, when painting building components (e.g. window frames) it is often desirable to protect certain areas (e.g. the glass windows) of the building components from paint overspray.

On occasion, it is necessary to mask painted portions of a vehicle or building from paints of a different color and overspray of paints of the same color. In addition, it is often desired to protect the surfaces (e.g. floors or walls) of the area (e.g. paint spray booth) in which the overcoating (e.g. painting) operation is performed.

In practice, masking operations are often one of the most time consuming and, therefore, expensive parts of the painting/overcoating process. In spite of attempts to develop suitable chemical masks for vehicle painting, vehicle painters continue to use primarily masking tape and paper to cover portions of a vehicle where paint is not desired. To mask the trim on a car, for example, will often require many hours of tedious labor. Furthermore, even when done carefully, defects in such paint masks allow paint to contact surfaces that are desired to be protected.

Chemical masking solutions have been proposed to the problem of protecting surfaces during coating processing operations. However, such techniques have often not found extensive use. Some of the proposed chemical masks have been unsuitable for application to portions of a vehicle or building because of damage that could potentially occur to the protected portions of the vehicle or building. Other compositions are not water-soluble which increases the difficulty and expense of removal. In addition, masks that require solvents for removal are problematic in view of the increasing regulation of disposal of solvents as environmental regulation becomes stricter with time. Other compositions are difficult to apply, difficult to remove, excessively costly, or the like.

From the above it is seen that an improved masking that is easily applied and removed, that provides good surface protection, that is economical, and whose use entails little or no environmental impact is needed.

SUMMARY OF THE INVENTION

The present invention provides improved methods and compositions for protecting a s vehicle (e.g. motor vehicle) or other surface subject to a coating operation such as painting, or for protecting a surface of an article manufacture during an assembly operation. In certain embodiments, the compositions comprise a thickener and a pH control agent.

DEFINITIONS

The term "aqueous solution" need not require the components comprising the solution actually be in solution phase (i.e. fully dissolved in water). The term "aqueous solution" thus includes aqueous mixtures, aqueous suspensions, aqueous dispersions, and the like.

The terms "masking material" and "masking composition" are used interchangeably to refer to a composition that can be applied to a surface to protect that surface from overcoating (e.g. with paint) and then subsequently removed from that surface (e.g. by washing/rinsing with water).

BRIEF DESCRIPTION OF THE DRAWINGS

[Not Applicable]

DETAILED DESCRIPTION

The present invention provides improved methods and compositions for protecting a vehicle (e.g. a motor vehicle) or other surface subject to a coating operation such as painting. The compositions described herein are particularly well suited for use on painted automobile surfaces. They provide effective protection of such surfaces from overspray during coating operations (e.g. painting operations), are easily removed, e.g. by a water wash, have extremely low VOCs, and do not damage or in any way mar the underlying surface.

For example, in one embodiment, certain regions of an automobile, or other surface, may be masked using the masking compositions of the present invention to protect those regions from paint overspray in a painting booth. In another embodiment, an article of manufacture (e.g. an automobile panel) may be protected from mechanical impact and/or abrasion by the presence of such an overcoating.

In addition it is also often desired to protect the surfaces of the area in which an overcoating operation (e.g. painting) is performed. In particular, it is desired to protect the walls, floors and other surfaces of such an area (e.g., a painting booth) from paint overspray and spills. In addition, it is also desirable to reduce airborne dust in such areas during overcoating operations.

This invention provides compositions and methods to meet these needs. In preferred embodiments, the methods entail coating the surface to be protected (e.g., a surface of a car or truck or the walls and/or floors of a spray booth) with a temporary protective masking composition as described herein. One or more coating (e.g. painting) operations, and/or mechanical/handling operations are performed and, when desired, the protective composition is removed (e.g., by a simple water wash).

The masking compositions of this invention, when applied to a surface (e.g. a painted of an automobile), typically produce a substantially continuous dry film that adheres well to the underlying surface. By "substantially continuous film" it is intended to mean herein a film generally lacking pinholes through which, oil, paint, dust, or other materials can reach the underlying surface. Further, the material can be removed easily from the surface to be protected after use with a water wash, or by mechanical means such as brushing, or peeling, or by combinations of these methods. In addition, because the material is biodegradable, it may be simply disposed of (e.g., washed down a sewer) with no substantial environmental impact.

When formulated as described herein, the masking compositions provide effective protection of an underlying surface against paint spray, mechanical insult, and the like. It was surprising discovery that, when formulated as described herein, siloxane surfactants can be effectively used to improve the wetting properties of the masking composition (particularly on painted surfaces of automobiles) without interfering with the painting, or other overcoating, operation, and without marring or otherwise damaging the underlying surface. Indeed, it was a surprising discovery that the coatings described herein are fully compatible with painted automobile surfaces.

One preferred method of protecting surfaces according to this invention includes steps of applying the masking compositions to the surface to be protected in a substantially continuous film. The compositions are then dried to form a coating that protects the underlying surface from the coating operation (e.g., paint overspray). The coating can then be subsequently removed from the surface by simply washing with water when it is longer required. In one particularly preferred embodiment, the coatings of the present invention are used to protect components of motor vehicles (e.g., automobiles or automobile surface finishes), and the walls and floors of spray booths or other areas or structures that may be contacted with overspray in a coating (e.g., painting) operation.

In certain preferred embodiments, the masking compositions comprise an aqueous solution of a film former and a siloxane-based surfactant, and optionally, a pH control agent (pH adjuster). The compositions can additionally include one or more additional components, including, but not limited to, cyclodextrin(s), additional surfactant(s) (e.g., non-ionic surfactants), alcohol(s), corrosion inhibitor(s), plasticizer(s), defoamer(s), biocides, dyes/colorants, and the like, as described herein. Various components and ranges for illustrative formulations are shown in the Examples.

The aqueous masking compositions are formulated by simple mixing of the various components. It is noted, that when a component is referred to as "X weight percent active ingredient of a masking composition" this is referred to as the weight percent of the active ingredient of the component in the "final" masking composition before drying. Thus, for example a commercial formulation of the thickener EP-1 consists of about 30 weight percent active ingredient. When the masking composition comprises 4 weight percent of this formulation, the final active ingredient weight percent is 1.2 weight percent (0.3×0.04=0.012).

I. Film Former.

The masking compositions of this invention typically utilize a film former to form a dry substantially continuous film on the surface that is to be protected during an overcoating operation. The film former is selected to be resistant to penetration by the overcoating material (e.g. paint), to be easily removed (e.g., by a water wash), to be compatible with the underlying surface (e.g., a painted automobile surface), and preferably to have low VOCs. In certain embodiments, the film former comprises an aliphatic polyol such as polyvinyl alcohol. Polyvinyl alcohols are well known to those of skill in the art and include, for example, DuPont Corporation's ELVANOL™ 5105 having a molecular weight of about 15,000 to about 27,000 daltons, DuPont Corporation's ELVANOL™ 5042 having a molecular weight of about 70,000 to 100,000 daltons, CELVOL™ polyvinyl alcohols (from Celanese Chemicals, Inc.), and the like. In certain embodiments, the aliphatic polyol component can include two or more different polyols having different molecular weight ranges. For example, DuPont Corporation's ELVANOL™ 5105 (15,000 to 27,000 daltons) and ELVANOL™ 5042 (70,000 to 100,000 daltons) can be used together in some formulations. In certain embodiments, the polyvinyl alcohol is CELVOL™ 205.

In certain embodiments, other film formers are contemplated in addition to, or as an alternative to polyvinyl alcohols. Such film formers include, but are not limited to starch, cellulose, carboxymethyl cellulose, hydroxyethyl cellulose, hydroxypropyl cellulose, algin, dextrin, gum Arabic, alginic acid, a cellulose gum, and the like.

The film former(s) typically comprise from about 1% to about 50% (weight percent of the liquid masking material), preferably from about 3% to bout 25%, more preferably from about 5% to about 15% or 20%, and most probably from about 7% or 10% to about 12% or 15%. In certain embodiments, the film former comprises about 11% (weight percent active ingredient) of the liquid masking material.

In certain embodiments, the film former(s) can optionally, additionally comprise one or more thickeners. Thickeners, in particular thixotropic (shear-thinning) thickeners, can act as film formers and, when used as such, are capable of preventing penetration of a coating material (e.g. paint) to an underlying surface (e.g. the surface as a vehicle.

Suitable thickeners include, but are not limited to neutralized crosslinked acrylate copolymers, neutralized crosslinked polyacrylic acids, neutralized polyacrylic acids, algins, carboxymethylcellulose, neutralized polymethacrylic acids, neutralized ethylene-acrylic acid copolymers, methocel, gum arabic, cellulose gum, neutralized styrene acrylic acid copolymers, and combinations thereof.

In certain preferred embodiments, the thickeners include B.F. Goodrich EP-1™, and/or B.F. Goodrich Albucril ESP.

If present, the thickener typically comprises from about 0.5 to about 10 weight percent, preferably from about 1 to about 5 weight percent, more preferably from about 1 to about 3 weight percent, and in some embodiments about 1.2 weight percent active ingredient of the aqueous masking material.

II. Siloxane-Based Surfactant.

The coating compositions of this invention additionally include a siloxane-based (silicone) surfactant. It was a surprising discovery that silicon surfactants, especially polysiloxane surfactants for aqueous systems are highly compatible with the masking compositions of this invention, permit effective wetting of an underlying surface (even a painted surface of an automobile) and yet, contrary to prevailing belief, do not damage the underlying painted surface or the applied overcoating material(s).

It was also a surprising discovery that the siloxane formulations disclosed herein, particularly when used in combination with a surfactant/disbursant (e.g., an oleyl alcohol ethoxylate (such as, for example Rhodasurf™)), have a shelf life at room temperature (e.g. 65-70° F.) of one year or more, preferably of at least two years, more preferably of at least 3 years, and most preferably of at least 4 or 5, or even 8 or 10 years.

Suitable siloxane-based surfactants include silicon surfactants compatible with aqueous systems. Such surfactants include, but are not limited to silicone polyoxyalkylene copolymers, organosilicone—polyether copolymer surfactants, and the like. In certain embodiments, preferred siloxane-based surfactants include BYK® surfactants available from BYK Chemie GmbH (West Germany). In certain preferred embodiments, the siloxane based surfactants include BYK® 347. Other silicon surfactants can be identified for example in Hill (1999) Silicon Surfactants, Marcel Decker, New York.

The siloxane(s) are preferably present in an amount sufficient to allow the masking material to wet the underlying surface and to form a substantially continuous film. In certain embodiments, the siloxane(s) range from about 0.01% to about 1%, preferably from about 0.05% to about 0.5%, and most preferably from about 0.2% to about 0.4%/weight percent of the aqueous masking material.

III. Cyclodextrin.

In certain embodiments, the masking materials additionally includes one or more water-soluble cyclodextrins. Without being bound by a particular theory, it is believed the cyclodextrin(s) encapsulate the siloxane and thereby enhance the stability and increase the shelf-life of the masking material.

When present, the cyclodextrins typically comprises about 0.01 to about 20 weight percent of the masking composition, preferably about 0.1 to about 5 or 10 of the of the masking composition, post preferably from about 0.1 to about 1 weight percent of the masking composition. In certain embodiments, the cyclodextrin comprises about 0.2 weight percent of the masking composition.

Cyclodextrins are well known to those of skill in the art and are commercially available. Suitable cyclodextrins include, but are not limited to alpha-, beta-, gamma-cyclodextrins, and various modified cyclodextrins, with alpha-cyclodextrins being preferred. Suitable cyclodextrins include, but are not limited to CAVITRON™ 8000, CAVITRON™ 8200, and the like (see, e.g., Cargill, USA).

IV. Defoamer.

In certain embodiments, the masking materials of this invention additionally includes one or more defoamers. The defoamer(s) break bubbles, and prevent bubble patterns that would otherwise appear in the coating from transferring to the underlying (e.g., painted) surface. In addition defoamers facilitate the loading of pressurized aerosol spray cans, pump sprayers or any other container in which the coating composition is to be stored and/or transported. Foam reduction allows more complete filling of the receptacle with the coating composition and reduces time spent waiting for foam to diminish during loading operations.

Preferred defoamers are compatible with aqueous systems and typically include a primary antifoam agent such as a hydrophobic silica, fatty amide, hydrocarbon wax, fatty acid, or fatty ester. Certain preferred defoamers can include, but are not limited to, combined surfactant-defoamers. Various defoamers include, but are not limited to FOAMASTER®, FOAMMAKER®, BUBBLE BREAKER®, and 1 and 2 octanol.

In various preferred embodiments the defoamer is a silicon-based defoamer (e.g., BYK®-024 from BYK Chemie GmbH (West Germany)).

In a preferred embodiment, the defoamer when present ranges up to about 5%, preferably from about 0.001% to about 2%, more preferably from about 0.001% to about 1%, and most preferably about 0.3% about 0.3%, by weight, of the aqueous masking material. In one embodiment, the defoamer is present at about 0.05%, by weight, of the masking material.

V. Additional Surfactant.

To provide a continuous and level film, the masking composition preferably adequately wets the surface to be protected. However, many surfaces, in particular, car body finishes, are themselves highly hydrophobic or purposely treated (e.g. waxed) to have a low surface free energy so that water will bead.

In a number of embodiments, an additional surfactant (in addition to the siloxane) is not required, particularly where the surface to be protected/masked is clean/pristine. Where the underlying surface is less clean/pristine, however, effective masking can be facilitated by the incorporation of one or more additional surfactants into the masking composition.

Suitable surfactants include, but are not limited to anionic surfactants (e.g., alkyl sulfates (e.g. RHODAPON™), ether sulfates (e.g., RHODAPEX™), sulfonates (e.g. RHODACAL™), dodecylbenzene sulfonates, alpha-olefin sulfonates, diphenyl oxide disulfonates, phosphate esters (e.g. Rhodafac™), carboxylates (e.g. Miranate™), etc.), cationic surfactants (e.g., imidazolines (e.g. Miramine™), ethoxylated amines (e.g. Rhodameen™, etc.), non-ionic surfactants (e.g., nonylphenol ethoxylates (e.g. Igepal CO series), octylphenol ethoxylates (e.g. Igepal CA series), nonionic esthers (e.g. Alkamuls™), oleyl alcohol ethoxylates (e.g. Rhodasurf™), ethoxylated mercaptans (e.g. Alcodet™), capped ethoxylates (e.g. Antarox™), blocked polymers, etc.), and amphoteric surfactants (e.g., imidazoline derivatives (Miranol™), fatty amine derivatives (e.g., Mirataine™), etc.). In certain preferred embodiments, the masking composition includes nonionic alkyl aryl surfactants such as Triton CF-10 and CF-12 (Rohm & Haas, Philadelphia, Pa., U.S.A.). Also suitable is Triton X-100 and surfactants having fluorinated alkyl chains such as "Fluorad" products sold by Minnesota Mining and Manufacturing (St. Paul, Minn., U.S.A.) and "Zonyl" products sold by DuPont Company (Wilmington, Del., U.S.A.) are also suitable. In addition, many embodiments include polyethoxy adducts or modified (poly)ethoxylates such as Triton DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104A made by Air Products), and the like.

One role the surfactant in the masking composition is facilitate wetting of the substrate (the underlying surface) by the masking composition thereby leading to the formation of a continuous film. In certain embodiments, a sufficiently continuous protective film could be obtained with little or no surfactant so long as underlying surface is sufficiently clean and/or the masking composition contains a very high solids content (e.g., high concentrations of thickener). Films containing high solids concentrations are often highly viscous and therefore difficult to apply, especially by spraying. The use of surfactants or other wetting agents is preferred as coatings containing surfactants show superior film-forming properties in a variety of application methods even where solids content is quite low.

In certain embodiments, the wetting properties of the masking compositions may be improved by adding certain surfactant compositions, and/or by adding various water soluble alcohols such as propanol, methanol, or isopropyl alcohol, or by adding aliphatic polyols such as water soluble alcohols up to octanol. In particularly preferred embodiments, surfactants are used in the masking compositions of the present invention.

Certain preferred surfactants for use in the masking compositions of the present invention should reduce the surface tension of the masking composition to a sufficiently low value that a level film, free of pinholes, is laid down. In certain embodiments, the surfactant will reduce the surface tension of the masking composition to at most about 25 dynes per centimeter, and more preferably to at most about 20 dyne/cm. To avoid formation of pinholes, the surfactant should not foam.

In addition, surfactants are preferably selected that work with a variety of surfaces such as those containing silicones, acrylic waxes, TEFLON® waxes, clear coats, natural and hydrocarbon waxes, etc. Still further preferred surfactants will be relatively inexpensive, will provide a product that does not spot, streak, or frame (i.e., evaporate faster at edges such as molding and/or trim) on the surface to be protected. Finally, the surfactant is preferably water soluble and otherwise compatible with the other components of the masking composition so that the composition does not separate and leave pinholes when dry.

Because many surfaces to be protected will have unusually low surface free energies, in many embodiments, surfactants are selected that are able to dramatically lower the surface and interfacial tensions of the masking composition. Compositions having very low surface tensions also tend to produce many fewer pinholes in the coating. Thus, any of the known classes of very low surface tension surfactants are preferred for use in certain embodiments of this invention.

One such class is the alkoxylates of fluorinated alkyl chains. Other functional derivatives (e.g., esters, sulfonates, carboxylates, ammonium compounds, etc.) of fluorinated alkyl chains also tend to produce low surface tension aqueous solutions. In general, replacement of hydrogens on an alkyl group by fluorine atoms leads to surfactants of unusually low surface tension. The above mentioned "Fluorads" and "Zonyls" are examples of surfactants having fluorinated alkyl chains.

One such surfactant comprises about 0.06% FLUORAD™ FC 171, about 0.04% Fluorad FC 430 and about 1.0% TRITON™ DF-16 or ACRYSOL™ 75. Another preferred formulation comprises about 0.5% sulfonated surfactant (BIOSOFT™ N-300) about 0.03% Fluorad FC 171 and about 0.02% FLUORAD™ FC 430. In still another particularly preferred embodiment for use on painted automobile surfaces, the surfactant is a combination of a sulfonated surfactant (e.g. Stephan BIOSOFT™ N300) and a non-ionic surfactant (e.g. an oleyl alcohol ethoxylate e.g., RHODASURF™ DA630).

It has been discovered that a in certain particularly preferred embodiments the surfactants include one or more non-ionic surfactants. Certain preferred surfactants include alcohol ethoxylates (e.g. TOMADOL™ 91-6. On preferred surfactant includes TOMADOL™ 91-6 and TRITON™ DF-16. In one preferred embodiment, the additional surfactant is DYNOL™ 604, a low foam non-ionic surfactant.

The surfactant is typically present in an amount effective to produce a coating that lays out smoothly in a substantially continuous film of the painted surface of an automobile. In certain embodiments, preferred masking compositions include up to 5 percent surfactant, preferably up to about 3 percent surfactant, still more preferably up to about 1 percent surfactant and most preferably up to about 0.5 or 0.3 percent surfactant.

VI. Plasticizer

In various embodiments, the masking materials of this invention additionally include one or more plasticizers to provide toughness and flexibility and in particular to prevent cracking of the film during drying and subsequent handling. Suitable plasticizers are well known to those of skill in the art and include, but are not limited to glycerine, sorbitol, sugars (e.g. glucose, sucrose, levulose, dextrose, etc.), urea, triethylene glycol, polyethylene glycol, and other water soluble plasticizers. These plasticizers may be used alone, or in combination with each other. One preferred combination of plasticizers is urea in combination with glycerine or glycerine derivatives such as glycerine monostearate or glycerine monooleate. Another particularly preferred combination is glycerin in combination with sorbitol.

In certain embodiments, Sorbitol, urea and glycerine are most preferred as plasticizers. When expressed as a percentage of the total coating compositions, the coatings utilizing urea as a plasticizer preferably include about 4 percent to about 12 percent urea, more preferably about 6 percent to about 12 percent urea and most preferably about 7 percent to about 12 percent urea, while the coatings utilizing glycerine and/or sorbitol as plasticizer preferably include about 0.8 percent to about 30 percent glycerine and/or sorbitol, more preferably about 4 to about 16 percent glycerine and/or sorbitol, and most preferably about 5 to about 10% glycerine and/or sorbitol.

In order to prevent cracking, the coatings of the present invention that are force dried can require a higher plasticizer concentration than the coatings that are simply air dried. Thus, coatings that are simply air-dried may contain plasticizer in concentrations near the lower end of the ranges provided above. Thus, the air-dried coatings contain about 4 percent (10 percent, by weight, of the dextrin) urea or 0.8 percent (2 percent, by weight, of the dextrin) glycerine. Conversely, force dried coatings preferably contain higher concentrations of plasticizer. Thus, the force-dried coatings may contain about 7.2 percent (18 percent, by weight, of the dextrin) urea or about 2 percent (5 percent, by weight, of the dextrin) glycerine. Of course, coatings containing the higher amounts of plasticizer may be air dried as well. In addition, coatings containing the lower amount of plasticizer may often be successfully force-dried.

VII. pH Control.

In certain embodiments, the masking compositions of this invention additionally, and optionally include a pH control. Suitable pH controls include essentially any material that can be used to adjust the pH of the masking composition without damaging the surface that the masking composition is applied to. The pH control can be provided as a buffer, and/or as a strong or weak acid, and/or as a strong or weak base.

In certain preferred embodiments the pH control is a basic pH control and is used to adjust the pH of the masking composition a range from about pH 7 to about pH 9.8, preferably from about pH 7.5 to about pH 9.5, more preferably from about pH 8.5 to about pH 9.5. In certain embodiments, the pH is adjusted to pH 9.5.

In certain embodiments, the pH control agent comprises one or more bases including, but not limited to, sodium hydroxide, potassium hydroxide, magnesium hydroxide, an amine, and sodium bicarbonate.

VIII. Flash Corrosion Inhibitor.

The masking compositions of this invention can optionally include one or more "flash corrosion inhibitors" ("flash rust inhibitors). Flash corrosion inhibitors compatible with aqueous systems are well known to those of skill in the art. Such inhibitors include, but are not limited to ammonium benzoate, ADD APT® Ferrocor flash corrosion inhibitor, M-435, M-240, alkyl alkanolamines (e.g., MORLEX™), and the like. In certain embodiments, the flash corrosion inhibitor comprises ammonium benzoate.

When present, the flash corrosion inhibitor typically ranges from about 0 to about 0.5 weight percent, preferably from about 0.1 weight percent to about 0.2 weight percent active ingredient in the masking composition.

IX. Preservative/Biocide.

The constituents of the masking compositions of this invention can, in certain instances, support the growth of microorganisms such as microbes, fungi, and the like. Thus, in certain embodiments, to increase storage life, it is desired to include a preservative. The term "preservative", as used herein, is intended to designate a substance showing antimicrobial properties, in particular bactericidal properties and preferably also antifungal properties. Preservatives are well known to those of skill in the art and include, but are not limited to anti-bacterial agents, anti-fungal agents, bacteriostatic agents, fungistatic agents, and enzyme inhibitors. Suitable preservatives include, but are not limited to benzoic acid, sorbic acid or the salts thereof, thimerosal (or merthiolate), phenyl mercuric acetate, phenyl mercuric nitrate, detergents (e.g., benzalkonium chloride), and sodium azide. Preferred preservatives are relatively or completely non-toxic to higher animals (e.g., mammals) and, thus, preservatives commonly used in foodstuffs and medical products are suitable. Such preservatives include, but are not limited to ethyl alcohol, chlorhexidine gluconate, sorbic and benzoic acid and their salts, and the like. Other preferred preservatives include KATHON™ LX (Rohm Haas, Inc.) and BTC 2125 (Stephan Chemical Co., Inc.).

The preservatives, when present, typically range from about 0 weight percent up to about 0.2 weight percent, preferably from about 0.01 weight percent, up to about 0.005 weight percent.

X. Dye/Coloring Agent.

The composition can additionally include dyes or color agents, scents, and the like. In certain embodiments that dyes range from about 0 weight percent up to about 0.05 weight percent, preferably from about 0.001 to about 0.02 weight percent active ingredient in the masking composition. In certain embodiments, the color agent (colorant) is Azo Rubin present at about 0.0015 weight percent of the masking material.

XI. Viscosity Control.

The masking compositions of this invention can optionally include one or more viscosity control agents. The viscosity control agents are typically selected to adjust the viscosity for particular application methods (e.g. brushing, doctor bar, spraying, etc.). Viscosity control agents are well known to those of skill in the art.

In certain embodiments, salts provide effective viscosity control agents and can effectively be used to "thin" the thickeners used in the compositions of this invention.

Suitable salts include, but are not limited to, sulfates (e.g. sodium sulfate, potassium sulfate, etc.), chlorides (e.g. sodium chloride, potassium chloride), bromides (e.g. sodium bromide, potassium bromide), and the like. In certain embodiments, the salt is sodium sulfate.

When present the salt typically ranges from about 0 to about 2 weight percent, preferably from about 0.1 to about 1 weight percent, and more preferably from about 0.1 to about 0.5 weight percent active ingredient of the masking composition.

XII. Humectant.

The masking compositions of this invention can optionally include one or humectants. Humectants are well known to those of skill in the art. Certain preferred humectants include glycols (e.g. polyethylene glycol 400), and the like.

Certain other humectants provide more environmentally friendly alternatives to traditional humectants. Thus, for example, humectant GRB2 is an 80% aqueous solution of a non-ionic dispersant mixed with low molecular weight polyols, which is supplied as a straw colored liquid and contains minimal VOCs.

When present, a humectant ranges from about 0 weight percent to about 5 weight percent, preferably from about 0.01 weight percent to about 1 or 2 weight percent, more preferably from about 0.1 weight percent to about 0.5 weight percent active ingredient in the masking composition.

XII. Alcohol.

In certain embodiments, the masking compositions of this invention optionally include a water soluble alcohol. The alcohol can act as a drying agent to speed drying of the film, as a wetting agent, and as a biocide/preservative.

Suitable alcohols include, but are not limited to various straight chain alcohols (e.g. propanol, methanol, ethanol, etc.) and/or various aliphatic' polyols such as water soluble alcohols up to octanol. The alcohol(s), when present, are typically present in a range from about 0 weight percent to about 20 weight percent, preferably from about 0.1 weight percent to about 10 weight percent, more preferably from about 0.2 weight percent to about 5 weight percent, and most preferably from about 3 to about 4 weight percent active ingredient of the masking composition.

EXAMPLES

The following examples are offered to illustrate, but not to limit the claimed invention.

Example 1

To produce various surface protective coatings, of this invention, components (as shown in Table 1 and Table 2) were combined at room temperature and at atmospheric pressure by slow stirring to form the various surface protective masking compositions. The homogeneous masking compositions were then adjusted to 8.5-9.5 by the addition of sodium hydroxide.

TABLE 1

One illustrative formulation of the masking composition.

| Component | Illustrative Species | percent solids active ingredient | Percentage Per unit |
|---|---|---|---|
| Water | DI Water | | 87.2785% |
| Film Former | Celanese Chemicals Cevol 205 PVA | 100.00 | 11.0000% |
| Plasticizer | Glycerine | 100.00 | 1.0000% |
| Flash corrosion inhibitor | Ammonium Benzoate | 100.00 | 0.0100% |

TABLE 1-continued

One illustrative formulation of the masking composition.

| Component | Illustrative Species | percent solids active ingredient | Percentage Per unit |
|---|---|---|---|
| Siloxane surfactant for aqueous systems | BYK Chemie, BYK 347 | 100.00 | 0.2000% |
| Silicone defoamer | BYK Chemie, BYK 024 | 96.00 | 0.2000% |
| low foam non-ionic wetting agent (surfactant) | Air Products, Dynol 604 | 100.00 | 0.0500% |
| Biocide | Rohm and Haas Kathon LX 14 | 14.00 | 0.0100% |
| Colorant | Azo Rubin | 100.00 | 0.0015% |
| pH adjuster | Ammonium Hydroxide | Target pH 9.5 | 0.2500% |
| | total solids | | 100.0000% |

TABLE 2

One illustrative formulation of the masking material comprising a cyclodextrin..

| Component | Illustrative species | Percent solids active ingredient | Percentage per unit |
|---|---|---|---|
| Water | DI Water | | 87.2285% |
| Film Former | Celanese Chemicals Cevol 205 PVA | 100.00 | 11.0000% |
| Plasticizer | Glycerine | 100.00 | 1.0000% |
| Flash corrosion inhibitor | Ammonium Benzoate | 100.00 | 0.0100% |
| Cyclodextrin | Gargill, Cavitron 84000 Gamma Cyclodextrin | 100.00 | 0.2000% |
| Silicone surfactant for aqueous systems | BYK Chemie, BYK 347 | 100.00 | 0.2000% |
| Silicone defoamer | BYK Chemie, BYK 024 | 96.00 | 0.0500% |
| low foam non-ionic wetting agent (surfactant) | Air Products, Dynol 604 | 100.00 | 0.0500% |
| Biocide | Rohm and Haas Kathon LX 14 | 14.00 | 0.0100% |
| Colorant | Azo Rubin | 100.00 | 0.0015% |
| pH adjuster | Ammonium Hydroxide | Target pH 9.5 | 0.2500% |
| | total batch size in gallons | | |
| | total solids | | 100.0000% |

TABLE 3

One illustrative long shelf-life formulation.

| Function | Ingredient | percent solids | percentage per unit |
|---|---|---|---|
| Film Former | Celanese, Celvol 205 Polyvinyl Alcohol film former | 100.00 | 5.0000% |
| Thickener | Xanthan gum thickener CP Kelco, Kelzan | 100.00 | 0.4000% |
| Biocide | Arch Biocides, Proxel GXL | 14.00 | 0.0300% |
| Humectant | Glycerine | 100.00 | 0.7500% |
| Surfactant | BYK Chemie, BYK 347 | 100.00 | 0.2000% |
| Surfactant | Rhodia, Rhodasurf TDA 8.5 (tridecyl alcohol ethoxylate) | 100.00 | 0.3000% |
| Color | Pigment, Azo Rubin | 100.00 | 0.0015% |
| Preservative | Ammonium Benzoate | 100.00 | 0.0100% |
| pH adjuster | Ammonium Hydroxide | 30.00 | 0.1200% |
| Solvent | DI Water | 0.00 | 93.1885% |
| | total solids | | 100.0000% |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A masking composition for the temporary protection of a surface during a coating procedure, said masking composition comprising an aqueous solution of:
a polyvinyl alcohol film former present in an amount ranging from about 0.15 weight percent to about 25 weight percent of said masking composition;
a siloxane-based surfactant in a concentration sufficient to allow said masking composition to wet a painted surface of an automobile; and
an ethoxylated alcohol surfactant;
wherein said masking composition has a shelf life at room temperature greater than about 1 year.

2. The masking composition of claim 1, wherein said masking composition has a shelf life at room temperature of greater than about two years.

3. The masking composition of claim 1, wherein said ethoxylated alcohol surfactant comprises an oleyl alcohol ethoxylate.

4. The masking composition of claim 3, wherein said film former ranges from about 1 weight percent to about 25 weight percent of said masking composition.

5. The masking composition of claim 3, wherein said film former ranges from about 3 weight percent to about 10 weight percent of said masking composition.

6. The masking composition of claim 1, wherein said masking composition further comprises a thickener.

7. The masking composition of claim 6, wherein said thickener is a xanthan gum thickener.

8. The masking composition of claim 6, wherein said thickener ranges from about 0.1 weight percent to about 1 weight percent of said masking composition.

9. The masking composition of claim 6, wherein said thickener is present at about 0.4 weight percent of said masking composition.

10. The masking composition of claim 1, wherein said masking composition further comprises a plasticizer or humectant.

11. The masking composition of claim 10, wherein said plasticizer is a simple sugar.

12. The masking composition of claim 10, wherein said plasticizer is selected from the group consisting of glucose, sucrose, and fructose.

13. The masking composition of claim 10, wherein said plasticizer is selected from the group consisting of sorbitol, glycerin, sucrose, urea, polyethylene glycol, polypropylene glycol, polyglycerol, and glycerol.

14. The masking composition of claim 13, wherein said plasticizer is present in an amount ranging from about 0.2 to about 12 weight percent of said masking composition.

15. The masking composition of claim 1, wherein said siloxane surfactant is present in an amount ranging from about 0.01 weight percent to about 1 weight percent of said masking composition.

16. The masking composition of claim 1, wherein said masking composition further comprises a pH adjuster.

17. The masking composition of claim 16, wherein said pH adjuster adjusts the pH of said composition to a basic pH.

18. The masking composition of claim 16, wherein said pH adjuster adjusts the pH of said composition to about pH 9.5.

19. The masking composition of claim 16, wherein said pH adjuster comprises a base selected from the group consisting of sodium hydroxide, potassium hydroxide, magnesium hydroxide, an amine, and sodium bicarbonate.

20. The masking composition of claim 1, wherein said masking composition further comprises a colorant and/or a biocide.

21. The masking composition of claim 1, wherein:
    said masking composition further comprises a thickener;
    said masking composition further comprises a humectant; and
    said masking composition further comprises a pH adjuster.

22. The masking composition of claim 21, wherein said masking composition further comprises:
    a biocide; and
    a colorant.

23. The masking composition of claim 21, wherein:
    said film former is present at about 5 weight percent of said masking composition;
    said thickener is present at about 0.4 weight percent of said masking composition;
    said humectant is present at about 0.75 weight percent of said masking composition; and
    said pH adjuster adjusts the pH of said composition to a basic pH.

24. The composition of claim 23, wherein said pH adjuster adjusts the pH of said composition to about pH 9.5.

25. The composition of claim 23, wherein said pH adjuster comprises a base selected from the group consisting of sodium hydroxide, potassium hydroxide, magnesium hydroxide, an amine, and sodium bicarbonate.

* * * * *